(12) United States Patent
Wei

(10) Patent No.: US 9,733,495 B2
(45) Date of Patent: Aug. 15, 2017

(54) POLARIZATION GLASSES

(71) Applicants: Xiamen Tianma Micro-Electronics Co., Ltd., Xiamen (CN); Tianma Micro-Electronics Co., Ltd., Shenzhen (CN)

(72) Inventor: Sifan Wei, Shanghai (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 56 days.

(21) Appl. No.: 14/849,494

(22) Filed: Sep. 9, 2015

(65) Prior Publication Data
US 2017/0003521 A1 Jan. 5, 2017

(30) Foreign Application Priority Data

Jun. 30, 2015 (CN) .......................... 2015 1 0374957

(51) Int. Cl.
*G02C 7/12* (2006.01)
*G02C 11/08* (2006.01)
(Continued)

(52) U.S. Cl.
CPC ................ *G02C 7/12* (2013.01); *G02B 1/14* (2015.01); *G02C 7/022* (2013.01); *G02C 7/108* (2013.01);
(Continued)

(58) Field of Classification Search
CPC .. G02C 7/108; G02C 11/087; G02C 2202/16; G02C 7/12; G02B 1/14; B82Y 20/00; Y10S 977/742
(Continued)

(56) References Cited

U.S. PATENT DOCUMENTS 7,771,045 B2   8/2010   Matera et al.
8,958,153 B2 * 2/2015   Feng ...................... B82Y 20/00
                                              359/487.01
(Continued)

FOREIGN PATENT DOCUMENTS

CN      101982802 A     3/2011
CN      102073072 A     5/2011
WO      2014043546 A1   3/2014

OTHER PUBLICATIONS

1st Office Action as issued in corresponding German Application No. 102015118037.5, dated Mar. 21, 2016.
(Continued)

*Primary Examiner* — Bumsuk Won
*Assistant Examiner* — Grant Gagnon
(74) *Attorney, Agent, or Firm* — Alston & Bird LLP

(57) ABSTRACT

Polarization glasses are provided. The polarization glasses include a frame, and a first lens and a second lens disposed within the frame. The first lens and the second lens each include a transparent substrate, an optical alignment base material and a carbon nanotube layer; the carbon nanotube layer is adhered to a surface of the transparent substrate through the optical alignment base material; the carbon nanotube layer includes multiple carbon nanotubes extending in a same direction, and the orientation of the optical alignment base material is parallel to the extension direction of the carbon nanotube. Since the carbon nanotube layer has a flat light absorption rate within a wide wave spectrum range, the polarization glasses may efficiently alleviate discomfort of human eyes caused by light, and the carbon nanotube layer may have an absorption and isolation effect on ultraviolet light.

13 Claims, 3 Drawing Sheets

(51) Int. Cl.
  *G02C 7/10* (2006.01)
  *G02B 1/14* (2015.01)
  *G02C 7/02* (2006.01)
  *B82Y 20/00* (2011.01)

(52) U.S. Cl.
  CPC .............. *G02C 11/08* (2013.01); *B82Y 20/00* (2013.01); *G02C 2202/16* (2013.01); *Y10S 977/742* (2013.01)

(58) Field of Classification Search
  USPC .......................................................... 351/49
  See application file for complete search history.

(56) References Cited

U.S. PATENT DOCUMENTS

| | | |
|---|---|---|
| 2006/0121185 A1 | 6/2006 | Xu et al. |
| 2011/0069274 A1* | 3/2011 | Han .................. G02C 11/08 351/62 |
| 2011/0122363 A1 | 5/2011 | Wei et al. |
| 2012/0075582 A1 | 3/2012 | Feng et al. |

OTHER PUBLICATIONS

Chinese Application No. 201510374957.7, First Office Action issued Sep. 26, 2016.

\* cited by examiner

POLARIZATION GLASSES

CROSS REFERENCE TO RELATED APPLICATIONS

The present application claims the priority of Chinese Patent Application No. 201510374957.7, titled "POLARIZATION GLASSES", filed on Jun. 30, 2015 with the State Intellectual Property Office of People's Republic of China, which is incorporated herein by reference in its entirety.

FIELD OF THE INVENTION

The present disclosure relates to the filed of glasses technology, and in particular to polarization glasses.

BACKGROUND OF THE INVENTION

Generally, strong light discomforts human eyes, and may cause harm to the eyes and/or threaten personal safety. Hence, people gradually realize the importance of wearing glasses under the strong light. A protective effect of the glasses on the human eyes mainly includes light intensity attenuation, harmful radiation prevention, anti-glare or the like. However, conventional glasses only are good for absorption and isolation of light having a special wavelength, and can not reduce the intensity of light entering into the glasses effectively.

BRIEF SUMMARY OF THE INVENTION

In view of this, polarization glasses are provided according to the present disclosure. The polarization glasses have a good light absorption rate within a wide wave spectrum range, reduce light intensity effectively, alleviate discomfort of human eyes caused by the light, and decrease harm to the human eyes.

To achieve the object described above, the technical solution is provided according to the present disclosure as follows.

Polarization glasses are provided, which include a frame, and a first lens and a second lens disposed within the frame, where the first lens and the second lens each include a transparent substrate, an optical alignment base material and a carbon nanotube layer; the carbon nanotube layer is adhered to a surface of the transparent substrate through the optical alignment base material; the carbon nanotube layer includes multiple carbon nanotubes extending in a same direction, and the orientation of the optical alignment base material is parallel to the extension direction of the carbon nanotube.

Compared with the conventional technology, the technical solution according to the present disclosure has at least following advantages.

Polarization glasses according to the present disclosure include a frame, and a first lens and a second lens disposed within the frame, specifically, the first lens and the second lens each include a transparent substrate, an optical alignment base material and a carbon nanotube layer, where the carbon nanotube layer is adhered to a surface of the transparent substrate through the optical alignment base material; the carbon nanotube layer includes multiple carbon nanotubes extending in a same direction, and the orientation of the optical alignment base material is parallel to the extension direction of the carbon nanotube.

According to above description, the technical solution according to the present disclosure has the following beneficial effects. First, the carbon nanotube layer has a flat light absorption rate within a wide wave spectrum range, that is, the carbon nanotube layer has a good absorption effect on light with a wavelength within the wave spectrum range. Hence, the polarization glasses according to the present disclosure can alleviate discomfort of human eyes caused by the light effectively and reduce harm to the human eyes. In addition, the carbon nanotube layer has a strong absorption effect for light in ultraviolet band, and thus has an absorption and isolation effect for the ultraviolet light. Second, the multiple carbon nanotubes in the carbon nanotube layer extending the same direction, so that the carbon nanotube layer has good polarization capability and can eliminate polarized light effectively. Third, the carbon nanotube layer is adhered to the transparent substrate through the optical alignment base material, and the orientation of the optical alignment base material is parallel to the extension direction of the carbon nanotube, therefore, extra adhesives are not required, and the polarization capability of the polarization glasses may be further improved, and the discomfort of human eyes caused by the light is alleviated.

BRIEF DESCRIPTION OF THE DRAWINGS

To describe the technical solutions in the embodiments of the present disclosure or in the conventional technology more clearly, the following briefly describes the drawings involved in the embodiments of the present disclosure. Apparently, the drawings described below are some embodiments, and persons of ordinary skill in the art can derive other drawings according to the drawings without any creative effort.

FIG. 1b is a schematic structural diagram of any one of lenses shown in FIG. 1a;

DETAILED DESCRIPTION OF THE INVENTION

The technical solutions of embodiments of the present disclosure are described clearly and completely hereinafter in conjunction with the drawings. Apparently, the described embodiments are only a few embodiments rather than all embodiments of the disclosure. Any other embodiments obtained by those skilled in the art on the basis of the embodiments of the present disclosure without creative work will fall within the scope of the present disclosure.

As described in the background section, conventional glasses only has a good effect for absorption and isolation of light having a special wavelength, and can not reduce the intensity of light entering into the glasses effectively.

In view of this, polarization glasses are provided according to the embodiment of the present disclosure. The polarization glasses have a good light absorption rate within a wide wave spectrum range, reduce light intensity effectively, alleviate discomfort of human eyes caused by the light, and decrease harm to the human eyes. Specifically, in conjunction with FIG. 1a to FIG. 3, the polarization glasses according to the embodiment of the present disclosure are described in detail.

Figure 1A:
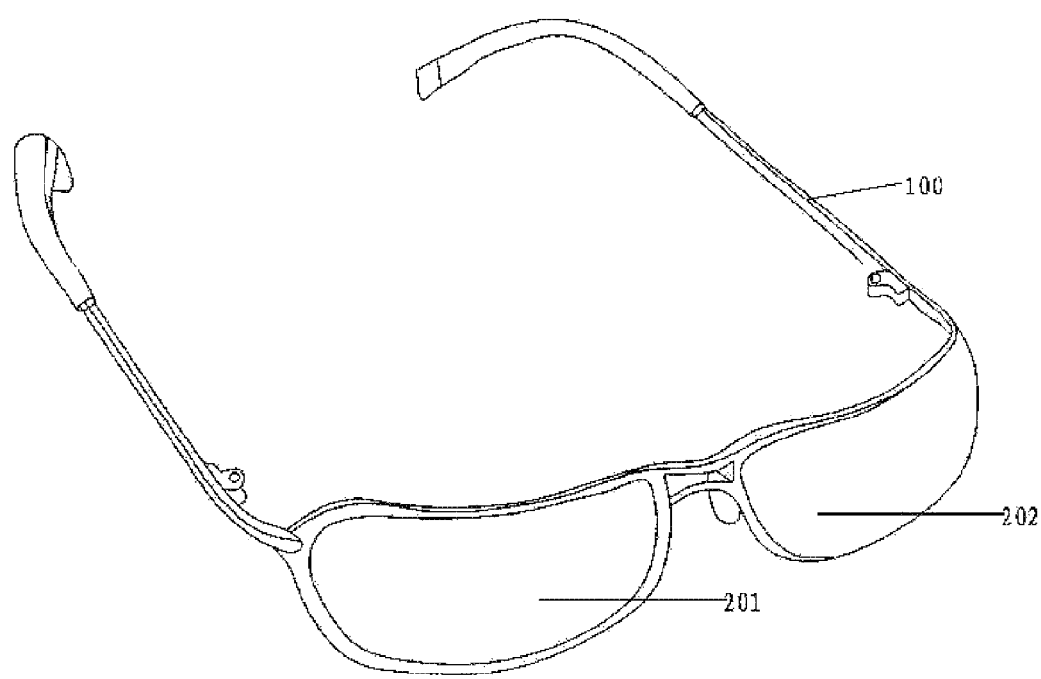
FIG. 1a is a schematic structural diagram of polarization glasses according an embodiment of the present disclosure.
Figure 1B:
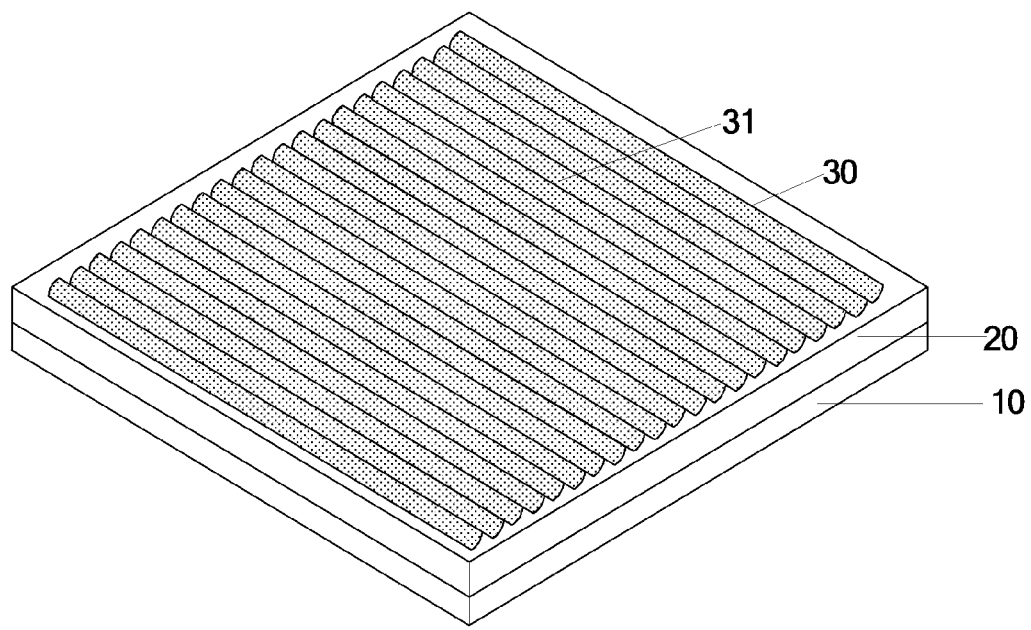

As shown in conjunction with FIG. 1a and FIG. 1b, FIG. 1a is a schematic structural diagram of polarization glasses according an embodiment of the present disclosure, and FIG. 1b is a schematic structural diagram of any one of lenses shown in FIG. 1a (e.g. first lens 201 and/or second lens 202). The polarization glasses include: a frame 100, and a first lens 201 and a second lens 202 disposed within the frame 100, specifically, the first lens 201 and the second lens 202 each include: a transparent substrate 10, an optical alignment base material 20 and a carbon nanotube layer 30; specifically, the carbon nanotube layer 30 is adhered to a surface of the transparent substrate 10 through the optical alignment base material 20; the carbon nanotube layer 30 includes multiple carbon nanotubes 31 extending in a same direction, and the orientation of the optical alignment base material 20 is parallel to the extension direction of the carbon nanotube 31.

Specifically, the transparent substrate mainly plays a supporting role and may be made of glass, quartz, diamond, plastic or the like. In the embodiment of the present disclosure, the transparent substrate is made of glass. In addition, thickness and transmittance of the transparent substrate are not limited in the embodiment of the present disclosure, which are designed according to practical applications.

The carbon nanotube layer includes at least one carbon nanotube film which is a self-supporting film which may be drawed from a carbon nanotube array. The carbon nanotube layer may be a large-area carbon nanotube layer which is formed by laying multiple carbon nanotube films flat or, the carbon nanotube layer may be a thick carbon nanotube layer which is formed by stacking multiple carbon nanotube films. Either way for arranging the carbon nanotube layer films can be used, as long as the carbon nanotubes of the carbon nanotube layer extend in a same direction. In addition, each carbon nanotube in the carbon nanotube layer is connected to an adjacent carbon nanotube in the first direction end to end by Van der Wals force.

The carbon nanotubes may include one or more types of single-walled carbon nanotubes, double-walled carbon nanotubes and multi-walled carbon nanotubes, which is not limited in the embodiment of the present disclosure. In addition, the diameter of the carbon nanotube inclusively ranges from 0.5 nm to 50 nm, and the length of the carbon nanotube inclusively ranges from 50 nm to 5 nm. Preferably, the length of the carbon nanotube according to the embodiment of the present disclosure inclusively ranges from 100 µm to 900 µm.

The optical alignment base material can not only adhere the carbon nanotube layer to the surface of the transparent substrate without extra adhesives, but also can, combined with the carbon nanotube layer, improve the polarization capability of the lens. The optical alignment base material has a good light alignment property, and can have a specific orientation under irradiation of polarized ultraviolet light. In the embodiment of the present disclosure, the orientation of the optical alignment base material is parallel to the extension direction of the carbon nanotube, that is, the angle between the orientation of the optical alignment base material and the extending direction of the carbon nanotubes is zero degree, thus the polarization capability of the lens is improved. The optical alignment base material may include one or more of cellulose triacetate, polyimide and polyamide acid. In the embodiment of the present disclosure, the optical alignment base material is polyimide preferably.

In addition, a method for preparing any one of the first lens and the second lens is provided according to the present disclosure. The method includes steps S1 to S4.

In step S1, a transparent substrate is provided.

In step S2, a surface of the transparent substrate is coated with an optical alignment base material.

The optical alignment base material is liquid initially, and can adhere and fix the carbon nanotube layer through being aligned and solidified by light radiation. The surface of the transparent substrate may be evenly coated with solution of the optical alignment base material by whirl coating or spin coating. The thickness of the coating may be determined as needed, and preferably, may inclusively range from 100 nm to 100 µm.

In step S3, a carbon nanotube layer is laid on a surface of the optical alignment base material away from the transparent substrate.

The carbon nanotube layer may be completely or partially submerge in the coating. In addition, step S3 may further include a step of pre-baking the liquid optical alignment base material, to remove redundant solvent in the coating structure which facilitates later light alignment and solidification processing. Specifically, for the pre-bake processing, the temperature may inclusively range from 90 degrees Celsius to 130 degrees Celsius, the length of time may inclusively range from 60 s to 120 s. In the embodiment of the present disclosure, the temperature for the baking processing is about 130 degrees Celsius, and the length of time for the baking processing is about 120 s.

In step S4, the optical alignment base material is solidified, and the carbon nanotube layer is adhered on the surface of the substrate.

The optical alignment base material is radiated by ultraviolet polarized light, so that the optical alignment base material has a predetermined light alignment orientation after being solidified. Specifically, energy of the ultraviolet polarized light may inclusively range from 300 mj to 1000 mj, and in the embodiment of the present disclosure, the energy of the ultraviolet polarized light may inclusively range from 500 mj to 800 mj optionally. Preferably, a polyimide film is used as the optical alignment base material. The polyimide film has the best light alignment capability under radiation of light with energy ranging from 500 mj to 800 mj. By adjusting the polarization direction of the polarized ultraviolet light, the angle between the polarization direction of the polarized ultraviolet light and the extending direction of the carbon nanotubes in the carbon nanotube layer may be zero degree, that is, the polarization direction of the polarizing ultraviolet light is parallel to the extending direction of the carbon nanotubes in the carbon nanotube layer.

The optical alignment base material may be heated to accelerate the solidification at a temperature inclusively ranging from 210 degrees Celsius to 230 degrees Celsius after the optical alignment by radiation of polarized ultraviolet light, where the length of time for the heating process may range from 20 minutes to 50 minutes optionally. In the embodiment of the present disclosure, the temperature for solidification is about 230 degrees Celsius, and the length of time for solidification is about 30 min.

At last, a structure obtained in step S4 is cut to obtain the lens.

Since the carbon nanotube layer has an optical polarization property, that is, the carbon nanotube layer is transmissive to light with a polarization direction perpendicular to the extension direction of the carbon nanotube, and is absorptive to light with a polarization direction parallel to the extension direction of the carbon nanotube, the polarization glasses according to the embodiment of the present disclosure may be further used as 3D glasses. The extension direction of the carbon nanotube in the first lens intersects with the extension direction of the carbon nanotube in the second lens. Furthermore, the extension direction of the carbon nanotube in the first lens is perpendicular to the extension direction of the carbon nanotube in the second lens.

To improve the polarization capability of the polarization glasses, the optical alignment base material of at least one of the first lens and the second lens is doped with a dichroic dye, and the dichroic dye has the same polarization direction as the carbon nanotube film in the lens doped with the dichroic dye. Specifically, the optical alignment base materials of the first lens and the second lens according to the embodiment of the present disclosure each are doped with the dichroic dye.

The dichroic ratio of the dichroic dye is not smaller than 7. The dichroic dye includes one or more of an azo-dye, an anthraquinone dye, a bipheny dye, a triphenyl dioxazine and derivative dye, a monomethine dye, a polymethin dye and a polycyclic dye. In some of the embodiment of the present disclosure, the dichroic dye is the azo dye.

It should be noted that, in preparing the lens, the dichroic dye may be doped into the optical alignment base material, so that the optical alignment base material has a specific orientation through being irradiated by the polarized ultraviolet light, and the orientation of the dichroic dye changes as the orientation of the optical alignment base material changes, thus polarization capability of the lens is improved.

Figure 2:
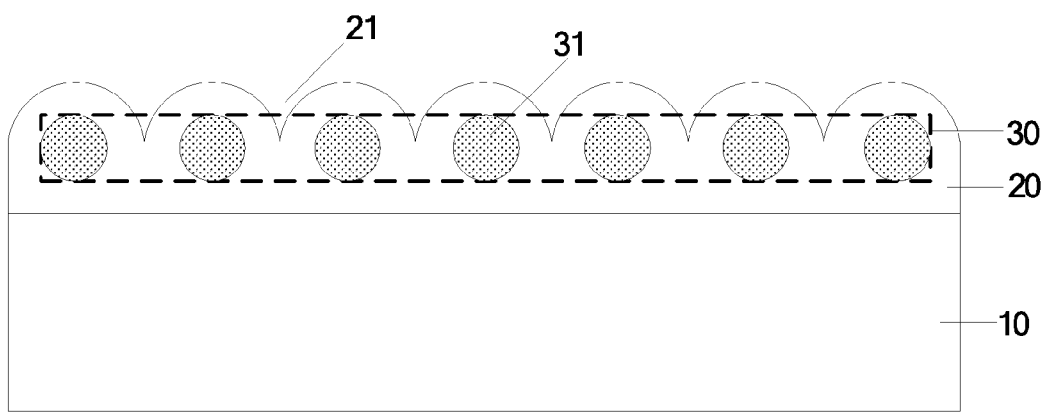
FIG. 2 is a schematic structural diagram of a lens according to another embodiment of the present disclosure.

FIG. 2 shows a schematic structural diagram of a lens according to another embodiment of the present disclosure. The lens includes a transparent substrate 10, an optical alignment base material 20 and a carbon nanotube layer 30.

Specifically, there are gaps between adjacent carbon nanotubes 31 in the carbon nanotube layer 30, and the optical alignment base material 20 penetrates into the gaps between the adjacent carbon nanotubes 31, so that the carbon nanotube layer 30 is fixed on the surface of the transparent substrate 10 by the optical alignment base material 20.

Furthermore, the optical alignment base material 20 covers the surface of the carbon nanotube layer 30 away from the transparent substrate 10, there are multiple grooves 21 on a surface of the optical alignment base material 20 away from the transparent substrate 10, and the extension direction of the groove 21 is parallel to the extension direction of the carbon nanotube 31.

Figure 3:
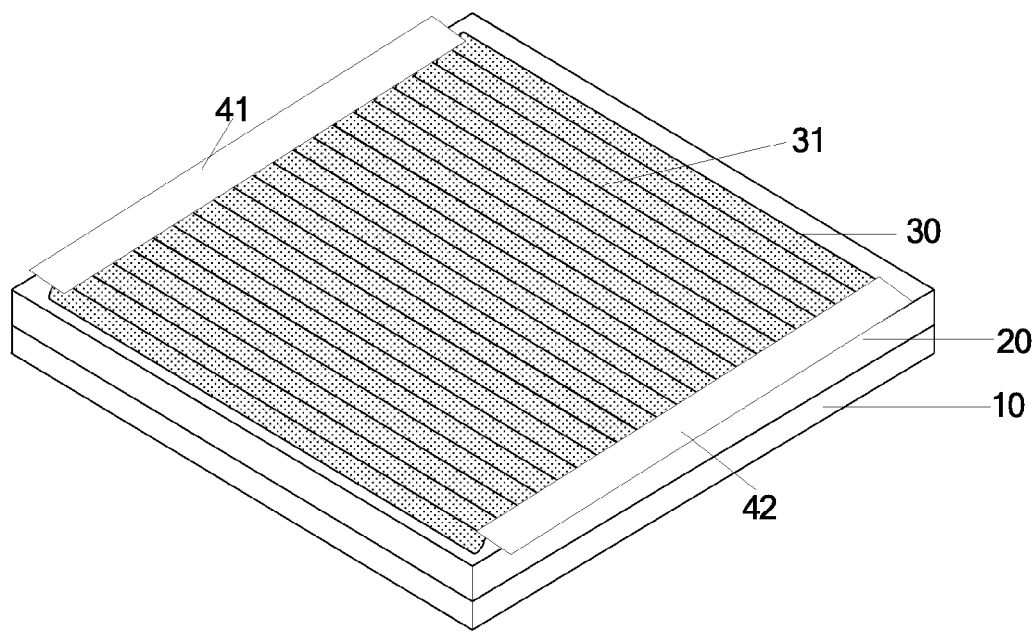
FIG. 3 is a schematic structural diagram of a lens according to still another embodiment of the present disclosure.

Furthermore, FIG. 3 shows a schematic structural diagram of a lens according to still another embodiment of the present disclosure. At least one of the first lens and the second lens further includes a first electrode 41 and a second electrode 42 which are disposed at two sides of the carbon nanotube layer 30 in the extension direction of the carbon nanotube 31, respectively, and the first electrode 41 and the second electrode 42 each are electrically connected to the carbon nanotube layer 30.

It should be noted that, the first electrode and the second electrode according to the embodiment of the present disclosure may be disposed on the surface of the carbon nanotube layer, or may be disposed inside the carbon nanotube layer, which is not limited in the present disclosure.

Specifically, the carbon nanotube has conductive property and the carbon nanotubes in the carbon nanotube layer are extended in a same direction, hence, the carbon nanotube layer has conducting anisotropy, that is, a square resistance of the carbon nanotube layer in a direction perpendicular to the extension direction of the carbon nanotube is ten times greater than a square resistance of the carbon nanotube layer in a direction parallel to the extension direction of the carbon nanotube. Hence, the first electrode and the second electrode which are connected to the carbon nanotube layer are provided, and a voltage is applied to the carbon nanotube layer, so that the carbon nanotube layer is heated, thus the polarization glasses have defogging function and defrosting function by being heated. Preferably, the first electrode and the second electrode are disposed in the extension direction of the carbon nanotube, that is, the first electrode and the second electrode are disposed at two sides of the carbon nanotube layer, respectively, and the two sides are in the extension direction of the carbon nanotube.

As shown in FIG. 3, a first electrode and a second electrode are both strip-type electrodes, and are electrically connect to all carbon nanotubes at two edges of the carbon nanotube layer respectively, thus the carbon nanotube layer is evenly heated when a voltage is applied on the carbon nanotube layer, and effect of defogging and defrosting is improved. Furthermore, the lens according to the present disclosure may further include multiple first electrodes and multiple second electrodes, which are disposed in a spaced manner at two sides of the carbon nanotube layer in a direction perpendicular to the extension direction of the carbon nanotube respectively. The multiple first electrodes and the multiple second electrodes each are electrically connected to the carbon nanotube layer, and the multiple first electrodes and the multiple second electrodes are disposed correspondingly, to ensure that the carbon nanotube layer is more evenly heated when the voltage is applied on the carbon nanotube layer, and the effect of defogging and defrosting is improved.

Furthermore, in order to protect the carbon nanotube layer or the optical alignment base material from being worn away, the polarization glasses according to the embodiment of the present disclosure may further include: a first protective film and a second protective film. The first protective film is disposed on a side of the first lens where the carbon nanotube layer is located, and the second protective film is disposed on a side of the second lens where the carbon nanotube layer is located. Materials and thicknesses of the first protective film and the second protective film are not limited in the embodiment of the present disclosure, which are designed according to actual applications.

Polarization glasses according to the embodiment of the present disclosure include a frame, and a first lens and a second lens disposed within the frame; specifically, the first lens and the second lens each include a transparent substrate, an optical alignment base material and a carbon nanotube layer; specifically, the carbon nanotube layer is adhered to a surface of the transparent substrate through the optical alignment base material; the carbon nanotube layer includes multiple carbon nanotubes extending in a same direction, and the orientation of the optical alignment base material is parallel to the extension direction of the carbon nanotube.

It can be known from the foregoing that the technical solution according to the present disclosure has the following advantageous effects. First, the carbon nanotube layer has a flat light absorption rate within a wide wave spectrum range, that is, the carbon nanotube layer has a good absorption effect on light at a wavelength within this wave spectrum range. Hence, the polarization glasses according to the embodiment of the present disclosure can alleviate discomfort of human eyes caused by the light effectively, and reduce harm to the human eyes. In addition, the carbon nanotube layer has a strong absorption effect on ultraviolet band, and has a strong absorption and isolation effect on the ultraviolet light. Second, the multiple carbon nanotubes in the carbon nanotube layer extend in the same direction, so that the carbon nanotube layer has good polarization capability and can eliminate polarized light effectively. Third, the carbon nanotube layer is adhered to the transparent substrate through the optical alignment base material, and the orientation of the optical alignment base material is parallel to the extension direction of the carbon nanotube, and therefore extra adhesives are not required, and the polarization capability of the polarization glasses may be further improved, and the discomfort of the human eyes caused by the light is alleviated.

The above description of the embodiments disclosed herein enables those skilled in the art to implement or use the present disclosure. Numerous modifications to the embodiments will be apparent to those skilled in the art, and the general principle herein can be implemented in other embodiments without deviation from the spirit or scope of the present disclosure. Therefore, the present disclosure is not limited to the embodiments described herein, but in accordance with the widest scope consistent with the principle and novel features disclosed herein.

What is claimed is:

1. Polarization glasses, comprising: a frame, and a first lens and a second lens disposed within the frame, wherein the first lens and the second lens each comprises:
    a transparent substrate having a top surface;
    an optical alignment base material disposed on the top surface of the transparent substrate, wherein the optical alignment base material has an alignment direction;
    a plurality of carbon nanotubes in a respective carbon nanotube layer associated with one of the said lenses, configured to attach to the top surface of the transparent substrate through the optical alignment base material, wherein the plurality of carbon nanotubes in the same carbon nanotube layer extend along a-same direction, parallel to the alignment direction of the optical alignment base material; and a first sheet-shaped electrode and a second sheet-shaped electrode arranged to electrically connect to the carbon nanotube layer at the ends of the plurality of carbon nanotubes in the carbon nanotube layer.

2. The polarization glasses according to claim 1, wherein each carbon nanotube in the carbon nanotube layer is connected to an adjacent carbon nanotube in the first direction end to end, by the van der Waals force.

3. The polarization glasses according to claim 1, wherein the polarization glasses further comprises a first protective film and a second protective film, wherein the first protective film is disposed on a side of the first lens where the carbon nanotube layer is located, and the second protective film is disposed on a side of the second lens where the carbon nanotube layer is located.

4. The polarization glasses according to claim 1, wherein the optical alignment base material comprises one or more of cellulose triacetate, polyimide and polyamide acid.

5. The polarization glasses according to claim 1, wherein the extension direction of the plurality of carbon nanotubes in the first lens is not parallel to the extension direction of the plurality of carbon nanotubes in the second lens.

6. The polarization glasses according to claim 5, wherein the extension direction of the plurality of carbon nanotubes in the first lens is perpendicular to the extension direction of the plurality of carbon nanotubes in the second lens.

7. The polarization glasses according to claim 1, wherein the optical alignment base material on one of the first lens and the second lens is doped with a dichroic dye, and the dichroic dye's polarization direction is the same as the extension direction of the plurality of carbon nanotubes in the said lens.

8. The polarization glasses according to claim 7, wherein a dichroic ratio of the dichroic dye is not smaller than 7.

9. The polarization glasses according to claim 8, wherein the dichroic dye comprises one or more of an azo dye, an anthraquinone dye, a biphenyl dye, a triphenyl dioxazine and its derivative dye, a monomethine dye, a polymethine dye and a polycyclic dye.

10. The polarization glasses according to claim 1, wherein the optical alignment base material penetrates into gaps between adjacent carbon nanotubes.

11. The polarization glasses according to claim 10, wherein the optical alignment base material covers a surface of the carbon nanotube layer away from the transparent substrate.

12. The polarization glasses according to claim 11, wherein there is a plurality of grooves extending in a same direction on the surface of the optical alignment base material away from the transparent substrate on each lens, and the extension direction of the grooves on each lens is parallel to the extension direction of the plurality of carbon nanotubes on the same lens.

13. The polarization glasses according to claim 12 wherein the first electrode and the second electrode are disposed along the extension direction of the plurality of carbon nanotubes on the same lens.

* * * * *